United States Patent Office

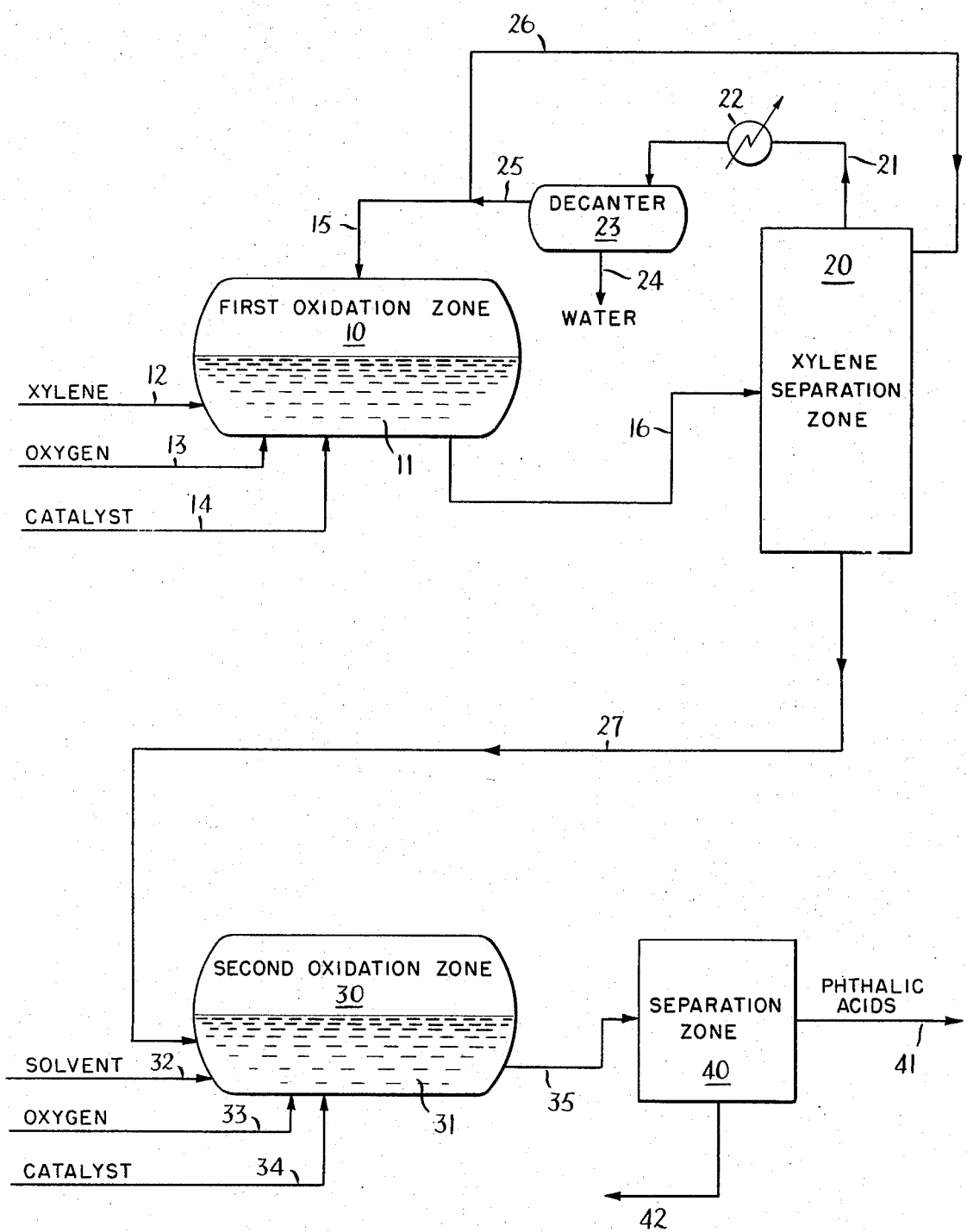

3,845,117
Patented Oct. 29, 1974

3,845,117
PROCESS FOR PREPARATION OF PHTHALIC ACIDS
John Kollar, Wyckoff, N.J., assignor to Halcon International, Inc.
Filed Dec. 14, 1972, Ser. No. 315,032
Int. Cl. C07c *51/20, 63/02, 63/26*
U.S. Cl. 260—524 R                13 Claims

ABSTRACT OF THE DISCLOSURE

A process for producing iso- or terephthalic acid from the corresponding xylene by partially oxidizing the xylene until not over about 70% of it has been converted to an oxidate containing substantial quantities of tolyl alcohol and tolualdehyde, removing much or all of the unreacted xylene and further oxidizing the essentially xylene-free oxidate under mild conditions with molecular oxygen to produce the iso- or terephthalic acid. Characteristics of this process include exceptionally high reaction rates and selectivities.

BACKGROUND OF THE INVENTION

Both isophthalic and terephthalic acids are major articles of commerce, to the production of which the prior art has devoted much attention in recent years. Although the ortho-isomer can be readily prepared by vapor phase oxidation technology (via phthalic anhydride), both the meta-(isophthalic) and para-(terephthalic) acid isomers are today producible only by liquid phase oxidation techniques.

The liquid phase oxidation techniques, however, are possessed of major difficulties. The fundamental problem appears to primarily reside in the oxidation of the second methyl group. That is, oxidation of the first methyl group of a xylene proceeds with ease to yield the corresponding toluic acid. However, the toluic acid, once formed, is recalcitrant and difficult to further oxidize. Thus, while the oxidation of xylenes to toluic acids is simple and straightforward, the oxidation of toluic acids to phthalic acids is one of the more notoriously difficult process steps of modern chemical technology.

The art, being aware of the problem, has proposed a variety of techniques to deal with it. In one technique, nitric acid is used as the oxidizing agent, but this, of course, is possessed of major disadvantages due to the corrosivity of the medium employed and is characterized by high raw-material costs and relatively low yields compared with other processes.

One of the more widely practiced techniques, which avoids the necessity for nitric acid, employs molecular oxygen as the oxidant for converting the meta- or para-toluic acids to the corresponding phthalic acids but requires the conjoint use of a heavy metal oxidation catalyst plus bromine. See, for example, U.S. Pat. No. 2,833,816. This technique works well but also presents significant corrosion problems attributable to the presence of bromine. Moreover, the reaction products require extensive treatment for the removal of bromine residues.

Others (see, e.g., U.S. Pat. No. 3,334,135) have employed massive quantities of heavy metal oxidation catalysts to avoid use of bromine. Such processes are faced with difficult problems associated with elimination of the heavy metal oxidation catalyst from the reaction effluent and in recovering catalyst for recycle.

Yet others have proposed to use substances such as acetaldehyde or methylethyl ketone, among others, in large quantity to promote the molecular oxygen oxidation of meta- or para-toluic acids to the corresponding phthalic acids. Illustrative of such processes are those disclosed in U.S. Pats. No. 2,853,514; 3,036,122; and, 3,240,803.

Such processes are obviously disadvantageous because (a) they require the use of relatively expensive materials as promoters and (b) they in essence convert a superficially simple oxidation into a process which unavoidably products substantial amounts of co-products, since the promoters are themselves oxidized in part to acetic acid and in part are simply burned to relatively valueless carbon oxides and $C_1$ fragmented materials such as methanol, formaldehyde and formic acid.

These problems are manifest and well known to the art. Correspondingly, a variety of techniques has been proposed to overcome them. One such technique is set forth at length in published South African patent application Ser. No. 68–5837. The process disclosed in this published application is of considerable academic interest since it presents a method for conducting a single-stage oxidation of a xylene to the corresponding phthalic acid on a continuous basis. This is accomplished by continuous introduction of xylene to a reaction zone at a rate such that the rate of formation of the phthalic acid and of the various intermediates becomes equal to the rate of xylene addition. By its very nature (*i.e.*, because of the inherent relations among the various rates of the several reactions involved), such a process produces an effluent relatively lean in phthalic acid product. Even these low concentrations of phthalic acid are obtained at exceedingly low reaction rates. A characteristic feature of a process of this type is that the reaction effluent obtained typically contains twice as much toluic acid as phthalic acid. Additionally, such a process is unnecessarily complex and expensive since recovery of this toluic acid for recycle (necessary to obtain an economically viable yield) presents substantial difficulty.

The presence of large proportions of toluic acids in a phthalic acid-containing effluent introduces other problems as well. It is known, for instance, that the amount of toluic acid present in a phthalic acid containing-effluent is an indication of the amount of other impurities present (see British patent specification No. 1,186,029) and that among such impurities are the carboxybenzaldehydes. As emphasized, *e.g.*, by Fujita et al. (Am. Chem. Soc., Divn. of Petroleum Chem., Preprints, *13* No. 4 (1968) at page A–85 *et seq.*), removal of carboxybenzaldehyde impurities from phthalic acids is notoriously troublesome and difficult, apparently because of co-crystallization phenomena which are but imperfectly understood. Since the phthalic acid products must, to find commercial acceptance for fiber, film and other polymer production, be of extraordinarily high purity, the presence of significant quantities of such impurities is essentially intolerable in a commercial process. The amount of such impurities present is conveniently indicated by the molar ratio of phthalic acid moieties to toluic acid moieties in the crude product, and in a commercially acceptable process, this ratio should be as high as possible.

Accordingly, a commercially viable xylene oxidation process should result in the obtaining of a reaction effluent having a high ratio of phthalic acid to toluic acid, should not require employment of extraneous promoters (*e.g.*, acetaldehyde, methylethyl ketone or the like), should not require the use of corrosive catalyst components such as bromine, should require only the use of minimal amounts of catalyst and should give high rates of product formation. Despite the vast quantity of research effort devoted to the development of iso- and terephthalic acid production processes in past years, such a process has until now not been available.

SUMMARY OF THE INVENTION

It has now been found possible to convert meta- and para- xylenes to the corresponding phthalic acids (*i.e.*, to isophthalic and terephthalic acids, respectively) at high rate without need for either extraneous promoters or corrosive catalyst adjuvant materials such as bromine. The effluents obtained by practice of this invention contain extremely high ratios (mole basis) of phthalic acid moieties to toluic acid moieties and, concomitantly, are readily susceptible to conventional purification techniques to yield fiber-grade isophthalic acid and/or terephthalic acid products.

In its most fundamental sense, the process of this invention entails a two-stage molecular oxygen oxidation, each stage being referred to as an "oxidation zone." Each such stage or oxidation zone is operated under a distinctly different set of reaction conditions. Separate reaction vessels need not be used, though such normally would be employed in commercial practice. Each oxidation zone can comprise one or a plurality of reactors connected in series or in parallel and would normally include auxiliary equipment such as pumps, heat exchangers and the like. The key feature of this invention resides, not in the configuration of each oxidation zone, but in the manner in which the oxidation within each zone is conducted and in the interstage treatment between oxidation zones.

Within the first oxidation zone, the xylene feed is converted to an oxidate containing toluic acid together with substantial amounts of oxygen-containing $C_8$ species, less completely oxidized than is toluic acid (more completely oxidized species can also be present). The oxidate is then freed of a substantial portion of the unreacted xylene, resulting in production of a concentrated oxidate containing toluic acid and the other oxygen-containing $C_8$ species. Within the second oxidation zone, the concentrated oxidate is further oxidized with molecular oxygen to produce the phthalic acid product.

The meaning of the phraseology oxygen-containing $C_8$ species, less completely oxidized than toluic acid" can readily be comprehended if conversion of a xylene to a phthalic acid is visualized as a sequential series of oxidation reactions, even though these reactions in practice may occur concurrently. The relevant portion of the sequence to be visualized is as follows:

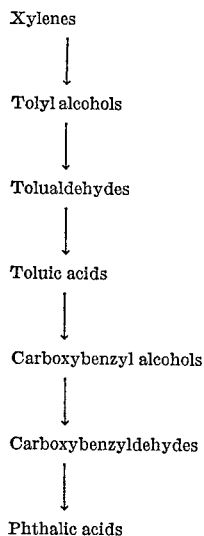

Xylenes
↓
Tolyl alcohols
↓
Tolualdehydes
↓
Toluic acids
↓
Carboxybenzyl alcohols
↓
Carboxybenzyldehydes
↓
Phthalic acids It is obvious that the foregoing sequence is neither necessarily indicative of actual reaction mechanism nor is it complete, since such materials as the xylylene diols, diformylphenylenes, etc. are also involved. Side reactions such as ester-forming reactions resulting in some production of such materials as the tolyl toluates and tolyl phthalates are also possible and are believed to occur to some extent. And, in the context of this invention, the phraseology "oxygen-containing $C_8$ species, less completely oxidized than toluic acid" refers to those materials other than xylene in the above sequence which appear above "toluic acids" and includes the tolyl toluates and the tolyl moiety of the tolyl phthalates where these materials are present. Inclusion of these $C_{16}$ materials within the ambit of the term "oxygen-containing $C_8$ species" is appropriate in the context of this invention because of the readiness with which such $C_{16}$ materials undergo cleavage to yield $C_8$ moieties.

Previous attempts at developing two-stage oxygen-based processes for converting xylenes to phthalic acids have been made (see, for example, U.S. Pat. No. 3,406,196). These processes have been unsuccessful either because of excessive conversion of xylene obtained in the first oxidation zone, resulting in the production of an oxidate incapable of being further oxidized except under drastic conditions such as those requiring employment of a bromine catalyst adjuvant or because excessive quantities of xylene were present in the second oxidation or for both reasons. Such processes therefore mandate the complexity of a two-stage process while concomitantly forfeiting the advantages, here disclosed, that can be attained by a two-stage process.

DETAILED DESCRIPTION OF THE INVENTION

As hereinbefore indicated, the process of this invention involves a two-stage oxidation of meta-xylene or para-xylene to the corresponding phthalic acid. Thus, for example, when para-xylene is the feed, terephthalic acid is the product obtained. It is, of course, practicable to employ mixed xylene feeds, in which case mixed phthalic acids are produced. Whether pure or mixed xylenes are employed in the process of this invention, it is not necessary that these materials be specially purified since the normally available materials of commerce are readily suitable. It is, however, preferred to employ xylenes of but minimal ethylbenzene content since, in the process of this invention, ethylbenzene is oxidized to benzoic acid, which must be removed at some point in the process if contamination of the product is to be minimized. Accordingly, it is desired to employ xylene feedstocks containing less than 5% by weight of ethylbenzene, and it is preferred to employ xylene feeds containing less than 1% by weight of ethylbenzene. It is of no materiality to the process of this invention whether the xylene feed is or is not anhydrous.

The process whereby the xylene is converted to the phthalic acid involves a series of process steps which can briefly be summarized as follows:

(a) conducting a molecular oxygen oxidation of the xylene within a first oxidation zone to produce an oxidate containing the corresponding toluic acid and oxygen-containing $C_8$ species, less completely oxidized than toluic acid;

(b) removing at least a predominate proportion of the unconverted xylene from the oxidate to give a relatively xylene-free concentrated oxidate;

(c) continuously introducing the concentrated oxidate and molecular oxygen into a second oxidation zone wherein the oxidate is further oxidized in the liquid phase in the presence of an appropriate solvent, thus converting the toluene moieties in the concentrated oxidate to phthalic acid;

(d) withdrawing from the second oxidation zone a slurry of phthalic acid in the solvent; and (e) recovering the phthalic acid product.

Within the first oxidation zone, the xylene feed is contacted with molecuular oxygen and an oxidation catalyst to convert the xylene in part to an oxidate containing toluic acid and oxygen-containing $C_8$ species, less completely oxidized than toluic acid. This oxidation is continued until at least 2%, desirably at least 5% and preferably at least 8% of the xylene has been converted, conversion here being defined as the ratio (expressed as a percentage) of moles of xylene reacted per mole of xylene fed to the first reaction zone.

The minimum conversion levels, it should be noted, are primarily dictated by economic considerations—the goal being to minimize the cost of separating unreacted meta- or para-xylene from the first-stage oxidate (for recycle and re-use). From a process standpoint, suitable oxidates are obtained at conversions even as low as 1%.

Maximum first-stage oxidation conversion, however, is a somewhat critical process consideration, which depends upon subsequent processing; specifically, the extent to which unreacted xylene is subsequently removed from the first-stage oxidate to produce the concentrate for feed to the second-stage oxidation. Where essentially complete xylene removal is to be effected, first-stage oxidation conversion must not exceed about 70% and desirably ought not to exceed about 50%. In this mode (i.e., one where unreacted xylene is to be essentially completely removed), a particularly preferable regime for first-stage oxidation is one which results in between about a 10% and about a 40% conversion of xylene in the first-stage. On the other hand, where the extent of xylene removal is to be less than essentially complete and the oxidate after concentration is to contain substantial amounts of xylene, lower first-stage conversions are required if attractive reaction rates are to be obtained in the second-stage oxidation. Thus, for instance, where the oxidate after concentration is to contain a substantial amount of xylene (e.g., 20–50 wt. percent of xylene in the concentrated oxidate), first-stage conversions should not exceed about 30%, desirably should not exceed about 20% and preferably should not exceed about 15%. Maximum xylene conversion should not exceed about 10% when the concentrated oxidate is to contain 50–60 wt. percent of xylene. Where only limited xylene removal is to be employed, a particularly preferred regime of operation for the first-stage oxidation is one which results in between about 2% and about 15% conversion. It follows from what has been said above that recycles of materials of low volatility and/or solubility within the process of this invention are minimized by maximizing the extent to which unreacted xylene is removed.

For optimum results in the process of this invention, the relation between first-stage conversion (denoted as "X") and the amount of xylene allowed to remain in the concentrated oxidate (the amount of remaining xylene being denoted as "M" where "M" is the moles of xylene remaining per mole of oxidate expressed on a xylene-free basis) should be such that the quantity of xylene permitted to remain in the concentrated oxidate should not exceed the value given by the equation:

$$M = 5.27 \ (^{+5.355X})$$

where "X," as indicated above, is the first-stage conversion, (expressed as a decimal fraction not as a percentage). Obviously, lower xylene concentrations are eminently practicable and such lesser concentrations can readily enable attainment of even more attractive results. Xylene concentrations greater than "M" are operative but are somewhat less attractive in terms of overall results obtained.

Control of first-stage oxidation conversion is readily accomplished, for example, by adjustment of reaction temperature and/or residence time within the first oxidation zone.

Other first-stage oxidation conditions are not of particular criticality. Temperatures between about 50° C. and about 220° C., desirably between about 80° C. and about 200° C. and preferably between about 100° C. and about 180° C. can be employed. Reaction pressure must be sufficient to maintain the xylene reactant in the liquid phase but, beyond this, is in no way critical. To minimize equipment cost, however, it would normally be desired to operate with total pressures within the first oxidation zone between about 1 atm. abs. and about 100 atm. abs. and more preferably between about 2 atm. abs. and about 50 atm. abs.

Catalyst levels employed in the first-stage oxidation would normally be within the range from about 1 p.p.m. to about 5000 p.p.m., desirably from about 5 p.p.m. to about 500 p.p.m. and preferably from about 10 p.p.m. to about 200 p.p.m. Catalyst levels are here expressed in p.p.m. by weight of contained metal.

Under these conditions, the desirable conversions would be obtained with residence times between about 10 seconds and about 10 hours, desirably between about 90 seconds and about 8 hours and preferably between about 6 minutes and about 6 hours. As used herein, residence time in a batch oxidation is essentially self-explanatory, while in a continuous oxidation it is defined, for convenience, as the volume of liquid phase within the first oxidation zone divided by the rate at which xylene-containing oxidate is withdrawn from the first oxidation zone, both volumes of course being expressed in consistent units.

The first-stage oxidation can be conducted in the presence or absence of an extraneous solvent, with a solvent-free oxidation being preferred. Where solvents are employed, suitable ones are the aliphatic monocarboxylic acids containing 2 to 6 carbon atoms; thus including acetic, propionic, butyric, isobutyric and the valeric acids. Acetic acid the most preferred.

After the desired xylene conversion is obtained, the oxidate containing toluic acid and the oxygen-containing $C_8$ species, less completely oxidized than toluic acid (i.e., tolyl hydroperoxides, alcohols and tolualdehydes, possibly together with tolyl esters—toluates and/or phthalates) is withdrawn from the first-stage oxidation zone. Aside from unreacted xylene and toluic acid, this effluent also contains catalyst residues, solvent, if employed, and oxidized $C_8$ species, more completely oxidized than toluic acid, including carboxybenzyl alcohols, carboxybenzaldehydes and some phthalic acids. In molar units, on a xylene- and solvent (if any)-free basis, typical first-stage oxidates would contain generally from about 15% to about 60% of tolyl alcohol; from 15% to about 70% of tolualdehydes; from about 4% to about 65% of toluic acid; from about 0.001% to about 5% of carboxybenzyl alcohols; from about 0.001% to about 5% of carboxybenzaldehydes and from about 0.001% to about 10% of phthalic acids.

As hereinabove indicated, the effluent from the first-stage oxidation zone is then processed for the removal of a predominant proportion of the unconverted xylene contained therein. Thus, in this step of the process, over 50% of the unreacted xylene is separated from the oxidate. Advantageously at least 80% and up to 90% or more of the unreacted xylene is removed from the oxidate. In general, the extent of xylene removal would most advantageously be such that the amount of xylene remaining would not exceed that given by the equation hereinabove set forth. Where essentially total removal of unreacted xylene from the oxidate without concomitant removal of oxidized $C_8$ species such as tolyl alcohols and tolualdehydes from the oxidate is practicable, such total removal is preferred. Normally, the removal and recovery of the unreacted xylene from the oxidate would be accomplished by one or more distillation operations of conventional type, although other separation techniques such as fractional crystallization can also be employed. Where the xylene removal is accomplished by distillation at pressures between about 0.5 atm. abs. and about 20 atm. abs., suitable distillation columns include those containing from about 2.5 to about 50 theoretical liquid-vapor contacting stages, with about 3–10 such stages being preferred, and operating at reflux ratios (here defined as moles of liquid reflux per mole of net overhead water-free product, either vapor or liquid) between about 0.1 and about 20, preferably between about 0.1 and about 5.0.

The xylene so removed is preferably recycled to the first oxidation zone, but it can otherwise be disposed of. The material remaining after the xylene is removed is, of course, the concentrated oxidate of the composition given above, also containing catalyst residues and usually also containing small amounts of unconverted xylene. Normally, the concentrated oxidate would contain less than 25 wt. percent, desirably less than 20 wt. percent and preferably 0–5 wt. percent of unconverted xylene, though with low conversion concentrated oxidates (less than ca. 10% xylene conversion), amounts of xylene up to 60 wt. percent are tolerable.

The concentrated oxidate is then introduced to the second oxidation zone wherein the toluate moieties are converted to phthalic acid by contact thereof in the liquid phase with molecular oxygen. The second oxidation is preferably carried out in the presence of a lower aliphatic monocarboxylic acid of 2 to 6 carbon atoms (preferably acetic acid) which functions as a solvent and in the presence of an oxidation catalyst. This invention requires that the concentrated oxidate be continuously introduced to the second oxidation zone. Solvent and oxidation catalyst need not be continuously introduced to the second oxidation zone, though in preferred practice they would also be continuously introduced, separately or in admixture with the concentrated oxidate.

Reaction temperatures within the second-stage oxidation zone differ significantly from those employed in the first stage. When temperatures below about 50° C. are employed, reaction rate in the second stage tends to fall, while when temperatures above about 150° C. are employed, decarboxylation reactions and $CO_2$ make tend to increase and further, reaction rate actually falls. Accordingly, temperature within the second oxidation zone should normally be from about 50° C. to about 150° C., desirably from about 70° C. to about 135° C. and preferably from about 80° C. to about 120° C.

While temperature is to some extent critical for optimum conduct of the second-stage oxidation, total pressure is in no way critical so long as it is sufficient to maintain a liquid phase. Economic considerations associated with design and construction of oxidation zone equipment, however, normally dictate use of pressures between about 1 atm. abs. and about 100 atm. abs., desirably between about 1 atm. abs. and about 70 atm. abs. and preferably between about 5 atm. abs. and about 40 atm. abs. On the other hand, oxygen partial pressure (measured in the vent gases from the oxidation zone) should be at least about 0.10 atm. abs. and preferably at least 0.3 atm. abs. Maximum oxygen partial pressure is dictated solely by flammability considerations.

As hereinabove indicated, an extraneous solvent (preferably acetic acid) is required for conduct of the second-stage oxidation. Of course, mixed solvents can also be employed. The amount of solvent employed is normally such that the concentration of total aromatics therewithin does not exceed 5 moles per liter of solvent during the course of the second-stage oxidation. Normal ranges of operation would call for an amount of solvent within the second oxidation zone that would result in a concentration between about 0.25 and about 4.5 moles of aromatic compounds per liter of solvent, desirably between about 0.5 and about 4.0 and preferably between about 1 and about 3 moles of aromatics per liter of solvent.

The concentration of catalyst required within the second oxidation zone is somewhat higher than that required for the conduct of the first-stage oxidation. Accordingly, amounts of catalyst between about 0.01 mole per liter of liquid present and about 0.6 mole per liter, desirably between about 0.025 mole per liter and about 0.3 mole per liter and preferably between about 0.05 mole per liter of liquid and about 0.20 mole per liter would be employed. Of course, substantially greater amounts of catalyst, up to 1 mole per liter or even more, can be employed, but there is little advantage accruing to the use of such large quantities and such usage can cause problems in recovery of catalyst for recycle and re-use. But, from the standpoint of rate, selectivity, etc., such operation is feasible.

Isophthalic and terephthalic acids, being relatively insoluble materials, tend to precipitate as they are formed. Thus, the effluent from the second oxidation zone is in the form of a slurry of phthalic acid in the carboxylic acid solvent and contains comparatively small amounts (generally less than 10 mole percent on a solvent-free basis) of $C_8$ species other than the phthalic acid. Thus, it will be seen that the process of this invention enables the production of effluents having extraordinarily high ratios of phthalate moieties to toluate moieties. These slurries are readily processed to recover the phthalic acid therefrom, e.g., by filtration or centrifugation. The phthalic acids can then be subjected to further purification by conventional techniques to obtain fiber-grade materials. Solvent, containing small amounts of unconverted toluate species together with small amounts of phthalate moieties dissolved therein, can be recycled to the second oxidation zone, with or without intermediate purification.

The oxidation catalysts employed in both the first and second oxidation zones are conventional in nature and include the polyvalent heavy metal catalysts, particularly those having atomic numbers from 23 to 29, inclusive, as well as cerium. Of these, cobalt, manganese, vanadium and cerium and combinations thereof are especially preferred species. These heavy metals are supplied to the oxidation zones in the form of compounds that are soluble or will become at least partially solubilized under the conditions of the oxidation reaction. Suitable compounds include the oxides, hydroxides and particularly the inorganic and organic salts of the catalyst metals. Supply of the catalyst metals, for example, in the form of their acetates, naphthenates and toluates and various other fatty acid salts, e.g., stearates, oleates, etc., is particularly preferred.

Also as indicated herein, the oxidant employed in both oxidation zones is molecular oxygen, which can be supplied in the form of air or can be supplied in concentrated form (oxygen contents of 85 mole percent or more). Supply of the oxygen in the form of oxygen-enriched air or diluted air is also readily practicable. Where diluents are employed, any of these which are inert under reaction conditions are suitable, including, for example, nitrogen, carbon dioxide, helium, neon, argon as well as the normally gaseous paraffin hydrocarbons (methane, ethane and propane). Mixtures of diluents can, of course, also be used.

It is noteworthy that in the foregoing discussion no mention has been made of the employment of extraneous promoters, initiators and the like since none need be employed. However, where desired, extraneous promoters such as, for example, acetaldehyde, methylethyl ketone, cyclohexanol, cyclohexanone, etc. can be employed in either oxidation zone, though their employment is not necessary. Although the use of these extraneous materials gives slight additional advantage in terms of rate and/or conversion, their use generally increases cost and results in by-product formation. Thus, in normal situations, they need not be employed, though in special circumstances the increased complexity may be warranted.

DESCRIPTION OF THE DRAWING

The annexed drawing is presented to further illustrate and explain this invention and its advantages. For ease in exposition but without intent thereby to limit this invention, the feed is assumed to be para-xylene and the molecular oxygen source is assumed to be air. In both the first- and second-stage oxidations, the catalyst is assumed to be cobalt supplied, for example, as the diacetate tetrahydrate salt. Further, continuous operation is assumed, though this invention is not so limited except insofar as the concentrated oxidate is necessarily required by this invention to continuously be introduced to the second oxidation zone.

To oxidation zone 10, within which is maintained a liquid phase reaction medium 11, are fed para-xylene via conduit 12 and air via conduit 13. Catalyst (e.g., cobalt acetate tetrahydrate dissolved in para-xylene) is introduced to oxidation zone 10 via conduit 14. Also introduced to oxidation zone 10 (via conduit 15) is a recycle stream consisting essentially of para-xylene. Within oxidation zone 10, the para-xylene and oxygen are intimately contacted with the liquid phase, thereby oxidizing the xylene in part to para-toluic acid and oxygen-containing $C_8$ species, less fully oxidized than toluic acid. Of course, some para-xylene is converted to some extent to oxygen-containing $C_8$ species, more fully oxidized than is toluic acid. These reactions are exothermic, and control of reaction temperature is conveniently facilitated by volatilizing a portion of the para-xylene feed and withdrawing it as a vapor. The para-xylene can then be condensed and returned (and optionally water co-condensed therewith can be separated, e.g., by decantation) together with or separately from the recycled para-xylene introduced via conduit 15. Intimate mixing of reactants can be facilitated by gas sparging or by provision of suitable mechanical agitation equipment (not shown).

A portion of the liquid phase reaction medium 11 is continuously withdrawn from the first oxidation zone 10 via conduit 16 and introduced to xylene separation zone 20, which suitably is one or a series of conventional fractional distillation columns of known type and characteristics and equipped with conventional vapor-liquid contacting devices (e.g., trays) and reboiling facilities. Within separation zone 20, the bulk of the unreacted para-xylene is separated from the first-stage oxidate. Unreacted para-xylene and any residual by-product water are taken overhead from xylene separation zone 20 via conduit 21, are condensed in cooler 22 and then flow to decanter 23. By-product water to the extent that such is present, being immiscible with and heavier than para-xylene, settles out within decanter 23 and is withdrawn therefrom via conduit 24 for discard. Unreacted para-xylene is also withdrawn from decanter 23 via conduit 25 and divided into two portions. One is returned to first-stage oxidation zone 10 via conduit 15. The second is returned as reflux to xylene separation zone 20 via conduit 26.

Concentrated oxidate, i.e., the oxidate formed in the first-stage oxidation zone 10 (which in preferred practice now contains less than 25 wt. percent and preferably contains 0–5 wt. percent of unconverted xylene), is withdrawn from xylene separation zone 20 via conduit 27 and continuously introduced into the second oxidation zone 30. Within oxidation zone 30 is maintained a liquid phase reaction medium 31 comprising the reactants, reaction products and reaction solvent. Solvent is supplied to oxidation zone 30 via conduit 32 and is shown as being separately introduced, though it can as readily be introduced in admixture with the concentrated oxidate flowing through conduit 27. Additionally, to the second oxidation zone 30 are also introduced a source of molecular oxygen (suitably air) via conduit 33 and additional catalyst via conduit 34. It is noteworthy that the catalysts employed in the first and second oxidation zones can be different metal compounds but would preferably be the same metal. It should also be noted that the amount of catalyst required to obtain desirable reaction rates in the second-stage oxidation is somewhat greater than that required in the first stage. However, as no catalyst removal need be employed between the first and second oxidation zones (though, of course, such removal can be accomplished if desired), a substantial proportion of the catalyst required in the second oxidation zone is derived from the catalyst introduced to the first oxidation zone 10 via conduit 14. Further, it is also practicable to use more than the necessary amount of catalyst in the first oxidation zone in order to have sufficient catalyst within oxidation zone 30 without the need for separate introduction of catalyst via conduit 34.

Within oxidation zone 30, the concentrated oxidate from the first stage is further converted at high rate to terephthalic acid. Reaction product, essentially in the form of a slurry of terephthalic acid in solvent, is withdrawn from oxidation zone 30 via conduit 35 which communicates with separation zone 40. Separation zone 40 suitably comprises one or a plurality of filters or centrifuges. Solid terephthalic acid is then withdrawn from separation zone 40 via conduit 41 and can be subjected to further purification by conventional techniques to readily yield fiber-grade terephthalic acid. Solvent (mother liquor) containing dissolved terephthalic acid, by-products and catalyst residues is withdrawn from separation zone 40 via conduit 42. This material, with or without intermediate processing, can readily be recycled to oxidation zone 30 for re-use. Temperature control (i.e., removal of the exothermic heat of reaction) is readily accomplished by provision of cooling coils or by volatilization of a portion of the solvent or by combinations of these techniques. Removal of by-product water of reaction is readily accomplished by dehydration of solvent prior to its recycle or such water can be removed from the reactor effluent.

Both the first oxidation zone 10 and the second oxidation zone 30 can consist of one or a plurality of reactors connected in series or parallel or both. With respect to second oxidation zone 30, it is important to note that, where a plurality of reactors are employed, it is essential that at least some of the concentrated oxidate be directly introduced to each of the reactors employed.

EXAMPLES

The following examples are further presented as illustrative of the invention but are not intended as limiting the scope thereof. Throughout the following examples the following terms have the meanings hereinafter indicated. Gas volumes, where expressed, are measured at 0° C. and 760 mm. Hg.

*Conversion*—the ratio (usually expressed as a percentage) of (a) the moles of iso- or terephthalic acid in the effluent from the second-stage oxidation to (b) the moles of aromatics present in the feed to the second-stage oxidation, and is indicative of second-stage yield per pass.

*Selectivity*—the ratio (usually expressed as a percentage) of (a) the moles of iso- or terephthalic acid formed in the second-stage oxidation to (b) the total number of moles of aromatics fed to the second-stage oxidation minus the total number of moles of aromatics (other than iso- or terephthalic acid) remaining in the effluent from the second-stage oxidation. This term is indicative of ultimate yield inasmuch as the non-product aromatics can be recovered and recycled.

*Yield*—the ratio (usually expressed as a percentage) of (a) the moles of iso- or terephthalic acid product in the effluent from the second-stage oxidation to (b) the total number of moles of aromatics charged to the second-stage oxidation.

As herein defined "conversion" is conversion to the appropriate phthalic acid and is therefore synonymous with yield.

*Reaction Rate*—The number of moles of iso- or terephthalic acid produced per hour per liter of liquid phase reaction medium within the second-stage oxidation zone.

It is noteworthy that the foregoing definitions are confined to second-stage oxidation performance even though this invention contemplates two oxidation stages. Such definitions, however, are here justified since xylene oxidations are simple and straightforward and are known to occur at high rates, with high conversions being readily attainable. Toluic acid oxidations, however, as hereinbefore indicated, are notoriously difficult and occur at exceedingly low rates and are frequently characterized by the quite low conversions attained.

EXAMPLE I

Para-xylene, 500 gms., is charged to a stainless steel autoclave along with 100 p.p.m. (by weight) cobalt as the naphthenate. The vessel is agitated and the contents heated to 150° C. Air, at a rate of 100 liters/hour (measured at 0° C. and 760 mm. Hg), is supplied for 1.5 hours while the pressure is held at 11.2 atm. abs. Boiled-up xylene and water are condensed, water is separated by decantation and the condensed organic phase is returned to the autoclave.

Analysis of the products shows xylene conversion to be 24%. On a xylene-free basis, about 45 mole percent of the oxidate are oxygen-containing $C_8$ species less completely oxidized than toluic acid.

After removal of unreacted xylene and water of reaction, this effluent is used as feed to the following second-stage oxidations.

EXAMPLE II

An essentially xylene- and water-free first-stage oxidate, obtained in Example I above, is divided in two portions. Approximately 18% of the oxidate is admixed with acetic acid solvent to an aromatic concentration of 0.91 mole/liter. This admixture is charged to a stainless steel reactor along with 0.1 mole/liter cobalt as the diacetate tetrahydrate and heated to 100° C.

The remainder of the first-stage oxidate is admixed with acetic acid to an aromatic concentration of 1.8 moles/liter, with cobalt at 0.09 mole/liter. All of this portion is continuously pumped into the reactor along with air (at 190 liters/hour) over a 3-hour period, at a pressure of 18 atm. abs.

Analysis of the final oxidate shows a terephthalic acid yield of 97.4%.

EXAMPLES III–XII

The procedure outlined in Example II is repeated with substantially identical first-stage oxidates. Conditions for these examples are outlined below in Table I. All the examples are run at 18 atm. abs. and an air rate of 190 liters/hour.

A very strong effect of temperature on terephthalic acid yield is apparent from the results in Table I. Reactions run at 100–110° C. result in substantially higher yields than those at 130° C. and 85° C.

EXAMPLE XIV

Para-xylene is continuously oxidized in a 1-liter, stainless steel stirred autoclave equipped with a liquid phase draw-off positioned to maintain a 500 cc. liquid volume within the autoclave. During the oxidation, some para-xylene is volatilized, withdrawn via a vapor outlet, condensed and returned to the autoclave after water by-product formed in the reaction is separated by decantation. In this example, para-xylene, containing 50 p.p.m. (by weight) of cobalt supplied as the naphthenate, is introduced to the autoclave at the rate of 2500 gms./hour. The oxidant source employed is air, which is introduced at the rate of 130 liters/hour (gas volume measured at 0° C. and 760 mm. Hg). During the oxidation, the autoclave is maintained at 130° C. and pressure is maintained at 18 atm. abs. Under these condition, the residence time of the para-xylene within the autoclave is approximately 10 minutes, and about 5.2% of the para-xylene feed is converted to an oxidate containing p-toluic acid and oxygen-containing $C_8$ species, less completely oxidized than toluic acid. On a xylene-free basis, the oxidate contains approximately 20–30 mole percent of toluic acid, about 70–80 mole percent of less oxidized materials and about 1–5 mole percent of more oxidized materials. The effluent is then distilled in a 1-inch diameter, 10-plate Oldershaw column maintained at 1 atm. abs. and operated with a reflux ratio of 0.3:1 (moles of reflux per mole of net overhead distillate product on a water-free basis) to remove essentially all of the unreacted para-xylene contained therein. The concentrated oxidate thus produced is then admixed with acetic acid such that the admixture contains 2 moles of aromatic substances per liter of acetic acid and the admixture is continuously introduced into a second autoclave having an identical configuration to that employed in the first-stage oxidation. Additional cobalt, charged as the diacetate tetrahydrate, is also added such that the resultant concentration of cobalt is continuously maintained at 0.2 mole of cobalt per liter of total admixture. The second autoclave is maintained at 130° C. and at a total pressure of 35 atm. abs., with air also being

TABLE I

| | Initial charge | | | Continuous feed | | | | |
|---|---|---|---|---|---|---|---|---|
| No. | Temp., °C. | Aromatics concentration, mole/liter | Cobgalt concentration, mole/liter | Percentage of total aromatics initially charged | Aromatics concentration, mole/liter | Cobalt concentration, mole/liter | Time, hours | Yield, mole percent | Rate of reaction, mole/liter/hour |
| III | 100 | 0.91 | 0.1 | 18.5 | 1.82 | 0.09 | 3.0 | 97.4 | 0.74 |
| IV | 130 | 0.50 | 0.14 | 42.8 | 1.38 | 0.1 | 1.0 | 40 | 0.38 |
| V | 130 | 2.0 | 0.2 | 51.5 | 1.74 | 0.2 | 2.0 | 53 | 0.66 |
| VI | 130 | 2.0 | 0.2 | 53.0 | 1.6 | 0.2 | 2.0 | 69 | 0.86 |
| VII | 130 | 2.0 | 0.2 | 53.0 | 1.6 | 0.2 | 5.0 | 85 | 0.44 |
| VIII | 110 | 0.91 | 0.2 | 25.0 | 1.82 | 0.18 | 2.2 | 98.5 | 0.89 |
| IX | 100 | 0.95 | 0.1 | 18.5 | 1.89 | 0.10 | 1.5 | 83.6 | 1.35 |
| X | 85 | 1.04 | 0.2 | 18.5 | 2.05 | 0.2 | 3.0 | 92.7 | 0.75 |
| XI | 85 | 1.0 | 0.1 | 18.5 | 2.0 | 0.1 | 3.0 | 90.8 | 0.76 |
| XII | 85 | 1.0 | 0.1 | 18.5 | 2.0 | 0.1 | 3.0 | 93.4 | 0.76 |

EXAMPLE XIII

P-xylene, 500 gms., and acetic acid, 500 gms., are charged to a stainless steel autoclave, along with 50 p.p.m. (wt. basis) of cobalt, charged as the diacetate tetrahydrate. The autoclave is sealed and agitated and the contents heated to 150° C. Air is introduced at 100 liters/hour for a period of 1.5 hours at 10.2 atm. abs. Boiled-up water, acetic acid and xylene are condensed and refluxed to the reactor.

The oxidate is distilled to remove the water of reaction, acetic acid and unreacted xylene. Analysis of the distillate shows a xylene conversion of 20%, with about 44 mole percent being oxygen-containing $C_8$ species less fully oxidized than is toluic acid. This essentially water- and xylene-free oxidate is then further oxidized as in Example III. The terephthalic acid yield is 97.5%.

supplied thereto at a rate sufficient to maintain the oxygen concentration in vent gas leaving the second-stage oxidation at 5 mole percent. Further, liquid rate to the second-stage autoclave is controlled such that the residence time therewithin is 2 hours. The effluent is continuously withdrawn and analyzed by a gas chromatographic procedure. Results indicate an 87.2% conversion to have been attained. The rate observed is 0.87 moles/liter/hour. Reaction selectivity exceeds 95%. This example is repeated employing meta-xylene as feed. Essentially identical conversions, selectivities and rates of formation of isophthalic acid are observed.

EXAMPLE XV

The procedure of Example XIV is repeated in all respects except that the second-stage oxidation temperature is reduced to 110° C., while reactor residence time is reduced (by increasing feed rate) to 0.5 hour. Conversion attained is 97.5%. Rate is 3.85 moles/liter/hour.

EXAMPLE XVI

The procedure of Example XIV is again repeated, with the second-stage reaction pressure being reduced to 18 atm. abs. with the oxygen concentration in the vent gas maintained at 4 mole percent. Additionally, catalyst concentration in the second-stage oxidation is halved to a level of 0.1 mole/liter. Reaction temperature is 100° C. and residence time is 1.0 hour. A 90.5% conversion is attained and reaction rate is 1.81 moles/liter/hour. Selectivity is in excess of 93 mole percent.

EXAMPLE XVII

The procedure of Example XIV is repeated again and additionally the feed to second-stage oxidation is diluted (prior to admixture with acetic acid solvent) with p-xylene such that the resultant second-stage feed contains 4 moles of xylene/mole of original oxidate. The second-stage oxidation is conducted at the conditions of Example XVI except that the residence time is increased to 3 hours. Conversion is 82% at a selectivity of 91%.

EXAMPLE XVIII

The procedure of Example XVI is repeated in all respects except that residence time is increased to 2 hours and the feed to the second-stage is diluted with para-xylene such that the concentrated oxidate contains 43 wt. percent of para-xylene. In this example, second-stage oxidation zone residence time is 2 hours. Conversion is 89.5%. Selectivity, as in previous examples, exceeds 90%. Reaction rate is 0.89 mole/liter/hour.

EXAMPLE XIX

Para-xylene is continuously oxidized in a 1-liter, stainless steel stirred autoclave equipped with a liquid phase draw-off positioned to maintain a 500 cc. liquid volume within the autoclave. During the oxidation, para-xylene is volatilized, withdrawn via a vapor outlet, condensed and returned to the autoclave after water by-product formed in the reaction is separated by decantation. In this example, para-xylene, containing 50 p.p.m. (by weight) of cobalt supplied as the naphthenate, is introduced to the autoclave at the rate of 800 gms./hour. The oxidant source employed is air, which is introduced at the rate of 190 liters/hour (gas volume measured at 0° C. and 760 mm. Hg). During oxidation, the autoclave is maintained at 130° C. and pressure is maintained at 18 atm. abs. Under these conditions, about 17.9% of the para-xylene feed is converted to an oxidate containing p-toluic acid and oxygen-containing $C_8$ species, less completely oxidized than toluic acid. The effluent is then distilled to remove essentially all of the unreacted para-xylene contained therein. The concentrated oxidate thus produced is admixed with acetic acid such that the admixture contains 2 moles of aromatic substances per liter of acetic acid solvent and the admixture is continuously introduced into a second autoclave having an identical configuration to that employed in the first-stage oxidation. Additional cobalt is also added (as the diacetate tetrahydrate) such that the resultant concentration of cobalt is continuously maintained at 0.2 mole of cobalt per liter of total admixture. This second autoclave is maintained at 110° C. and at a total pressure of 35 atm. abs., with air also being supplied thereto at a rate sufficient to maintain the oxygen concentration in the vent gas leaving the second-stage oxidation at 5 mole percent. Further, liquid rate to the second-stage autoclave is controlled such that the residence time therewithin is 1 hour. The effluent is continuously withdrawn and analyzed by a gas chromatographic procedure. Results indicate a 97.0% conversion to have been attained. The rate observed is 1.94 moles/liter/hour, and the selectivity is approximately 97%. This example is repeated employing meta-xylene as feed. Essentially identical conversions, selectivities and rates of formation of isophthalic acid are observed.

CONTROLS A THROUGH C

By way of contrast to the foregoing runs, a run is conducted employing chemically pure para-xylene (containing over 99.8% by weight of para-xylene) as the feed to the second-stage oxidation, the conditions employed in this comparative example being otherwise identical to those employed in the second-stage oxidation of Example XIV. Selectivity observed is about 84%. The conversion is only 32.5%, corresponding to a rate of 0.32 mole/liter/hour. It should be noted that in all of the foregoing examples, conversion approached or exceeded 90%, almost three times that here observed. The effluent here obtained contains substantial quantities of toluic acid. Accordingly, additional control examples are carried out. The feeds employed are para-xylene plus a portion of the effluent obtained from Control A, which has first been treated (by filtration and low temperature crystallization) for removal of terephthalic acid contained therein. The number of moles of para-xylene employed is equal to the moles of terephthalic acid removed. In the first of the two runs conducted (Control B), the procedure and conditions of Control A are repeated. The conversion observed is only 14.1%, less than half of that of the control, while the rate is only 0.14 mole/liter/hour. In the second of these runs (Control C), the residence time is increased from 2 hours to 4 hours, giving a conversion of 28.5%. In other words, rate remains essentially unchanged at 0.14 mole/liter/hour. Controls B and C duplicate in essential respects the procedures of published South African patent application Ser. No. 68–5837.

CONTROL D

An additional control is carried out employing the conditions of Example XV, but feeding pure para-xylene to the second-stage oxidation rather than a concentrated oxidate. Additionally, residence time in the second-stage oxidation of this control is increased eight-fold, i.e., to 4 hours rather than the 0.5 hour used in Example XV. Despite the eight-fold increase in residence time, conversion is only 46.3%, corresponding to a reaction rate of 0.22 mole/liter/hour. Selectivity is approximately 82%.

CONTROL E

Paralleling Controls B and C above, a portion of the effluent from Control D was freed from terephthalic acid by filtration and low temperature crystallization. This terephthalic acid-free material, rich in toluic acid, is admixed with para-xylene and, using this feedstock, the procedure of Control D is again repeated to give a conversion of 28.6%, a rate of 0.14 mole/liter/hour.

EXAMPLE XX

Another sample of a concentrated oxidate prepared as described in Example XIX is diluted with para-xylene (prior to admixture with acetic acid solvent) such that the oxidate contains 59 wt. percent of para-xylene. This diluted oxidate is then subjected to a second-stage oxidation under the conditions described in Example XIX. Conversion is 93% while selectivity remains in excess of about 90%. Reaction rate is 1.86 moles/liter/hour.

EXAMPLE XXI

An additional portion of the concentrated oxidate prepared as described in Example XIX is used as feed to a second-stage oxidation, conducted as described in connection with Example XVI but with a 1.5 hour residence time. Conversion observed is 89%; selectivity exceeds 90%; reaction rate is 1.34 moles/liter/hour.

EXAMPLE XXII

An additional portion of the oxidate prepared as described in Example XIX is diluted (prior to admixture with acetic acid solvent) with p-xylene such that the resultant second-stage feed contains 2 moles of xylene/mole of original oxidate. The second-stage oxidation is conducted at the conditions of Example XVII. Selectivity exceeds 90% at a conversion of 81.5%.

CONTROL F

By way of contrast, not illustrative of the invention, pure para-xylene is used as feed to a second-stage oxidation, conducted under the conditions employed in Example XIV. Conversion is approximately 6%, too low to be accurately measured. Rate is 0.057 mole/liter/hour.

EXAMPLE XXIII

The procedure of Example XIV is repeated, with a xylene feed rate of 250 gms./hour and an air flow of 190 liters/hour (measured at 0° C. and 760 mm. Hg) and with reaction temperature increased to 150° C. The resultant para-xylene conversion is 48.2%. This oxidate is freed from unreacted para-xylene and is used as feed to a series of second-stage oxidations. In the first of these, the second stage is operated under the conditions of Example XVIII. Conversion is 84%, while selectivity is about 92%. Reaction rate is 0.84 mole/liter/hour.

EXAMPLE XXIV

The first-stage concentrated oxidate of Example XXIII is used as feed to a second-stage oxidation, conducted under the conditions used in Example XXIII except that residence time is increased from 2 hours to 3 hours. Conversion is 89%, while selectivity is about 94%. Reaction rate is 0.59 mole/liter/hour.

EXAMPLE XXV

A portion of the concentrated oxidate prepared in accordance with Example XXIII is employed in this example, which is a duplicate of Example XXIV except for the employment of an equimolar amount of manganese acetate in lieu of the cobalt catalyst of Example XXIV. Conversion, selectivity and rate are substantially similar to those observed in Example XXIV.

EXAMPLE XXVI

The first-stage concentrated oxidate of Example XXIII is used as feed to a second-stage oxidation conducted under the conditions used in Example XXIII except that the residence time is increased from 2 to 4 hours. Conversion is 92% while selectivity is 95%. Reaction rate is 0.46.

EXAMPLE XXVII

The first-stage concentrated oxidate of Example XXII is used as feed to a second-stage oxidation conducted under the conditions used in Example XXVI except that the catalyst concentration is reduced to 0.05 mole/liter. Conversion is 76.4% while selectivity is 90%. Reaction rate is 0.38.

EXAMPLE XXVIII

The first-stage concentrated oxidate of Example XXII is used as feed to a second-stage oxidation conducted under the conditions of Example XXVI except that the aromatics concentration in the second oxidation is reduced to 1.0 mole/liter. Conversion is 84% at a selectivity of 92%. Reaction rate is 0.21.

EXAMPLE XXIX

The procedure of Example XXVIII is repeated at an aromatics concentration of 4.0 moles/liter. Conversion is 95% at a selectivity of 96%. Reaction rate is 0.95.

EXAMPLE XXX

An additional portion of the concentrated first-stage oxidate of Example XXIII is diluted (prior to admixture with acetic acid solvent) with 0.4 mole of xylene/mole of original oxidate. A second-stage oxidation is conducted at the conditions of Example XVII. Conversion is 82.2% and selectivity exceeds 90%.

EXAMPLE XXXI

The procedure of Example XIV is repeated, with a xylene feed rate of 125 gms./hour and air flow of 150 liters/hour. Reaction temperature is increased to 150° C. The resultant para-xylene conversion is 62.4%. This oxidate is freed from unreacted para-xylene and is used as feed to a series of second-stage oxidations. In the first of these second-stage oxidations, the conditions of Example XXIII are repeated except that catalyst is increased from 0.1 mole/liter to 0.4 mole/liter. Conversion is 91.5% while selectivity is about 93%. Reaction rate is 0.915 mole/liter/hour.

EXAMPLE XXXII

A concentrated oxidate of Example XXXI is employed as feed to a second-stage oxidation conducted at a total pressure of 42 atm. abs., with vent oxygen concentration maintained at 4.2 mole percent. Catalyst and solvent levels are the same as in Example XVI. The temperature is 85° C. and residence time 1.0 hour. Conversion is 60.5%, while selectivity is 90%. Reaction rate is 1.20 moles/liter/hour.

EXAMPLE XXXIII

A concentrated oxidate of Example XXXI is employed as feed to a second-stage oxidation carried out under the conditions of Example XVII. Conversion is 82% and selectivity is 91%. Reaction rate is 0.55.

EXAMPLE XXXIV

The concentrated oxidate of Example XXXI is again employed as feed to a second-stage oxidation conducted under the precise conditions of Example XXXII in all respects except that, to the concentrated oxidate, is added 0.3 mole of acetaldehyde per liter of total feed. Conversion is 88%, while selectivity is about 90%. Reaction rate is 1.78 moles/liter/hour.

EXAMPLE XXXV

Example XXIV is repeated except that the second-stage oxidation temperature is increased to 130° C. Conversion is 60.0% at a selectivity of 89%. Reaction rate is 0.40.

EXAMPLE XXXVI

Example XXIV is repeated except that the second-stage oxidation temperature is decreased to 85° C. Conversion is 86% at a selectivity of 90.0%. Reaction rate is 0.57.

Comparison of the results of Controls A, D and F, particularly in respect of conversion and rate, clearly illustrate the shortcomings of prior art xylene oxidation techniques. Reaction rates are so low as to render attainment of high conversions to phthalic acids impracticable. Although higher temperatures tend to enhance rate, conversion to the phthalic acids remains low and selectivity tends to decrease. In Controls B, C and E, recycled materials from xylene oxidations are added to a xylene feed and it is noted that this further suppresses rate, thus presenting further barriers to attainment of high conversions.

Analysis of Examples XXIII, XXIV, XXVI, XXXV and XXXVI shows the normal decrease of rate with conversion of classical kinetics. Note, however, the inverse temperature effect of Example XXXV. The same surprising decline in rate with temperature can be qualitatively appreciated by comparing Examples XIV and XV. This rate decline may be a partial explanation of the failure of prior art attempts to prepare iso- or terephthalic acids in good yields from xylenes in one stage.

Analysis of Examples XVII, XXII and XXX, all of which achieve about the same final conversion and rate, demonstrates that a given second-stage result can be achieved in the presence of increasing quantities of unremoved xylene if first-stage conversion is reduced. Extrapolations based on the assumption of no interstage xylene removal indicate that corresponding results cannot be achieved in one stage. Accordingly, at least partial intermediate xylene removal between stages is required in order to achieve the advantages attained by the practice of this invention.

The foregoing description illustrates the methods of this invention. It will be understood that modifications and variations may be effected by those skilled in the art without departing from the spirit of this invention. Accordingly, it is intended that all matter contained in the foregoing description shall be interpreted as illustrative and not in a limiting sense.

What is claimed is:

1. A process for the oxidation of at least one member of the group consisting of meta- and para-xylene to the corresponding phthalic acid which comprises:
    (a) Oxidizing, in the presence of a polyvalent heavy metal oxidation catalyst selected from at least one member of the group consisting of cobalt, manganese, vanadium and cerium, the xylene with molecular oxygen in the liquid phase within a first oxidation zone until from about 2% to not in excess of about 70% of the xylene has been converted to an oxidate comprising unreacted xylene, toluic acid and oxygen-containing $C_8$ aromatic compounds, less completely oxidized than toluic acid, said oxidate containing, on a xylene- and solvent-free basis, from about 15 mole percent to about 60 mole percent of tolyl alcohol, from about 15 mole percent to about 70 mole percent of tolualdehydes, from about 4 mole percent to about 65 mole percent of toluic acid, from about 0.001 mole percent to about 5 mole percent of carboxylbenzyl alcohols, from about 0.001 mole percent to about 5 mole percent of carboxybenzaldehydes and from about 0.001 mole percent to about 10 mole percent of phthalic acids;
    (b) Removing at least a predominant proportion of unconverted xylene from the oxidate to recover a concentrated oxidate comprising the toluic acid and the oxygen-containing $C_8$ aromatic compounds, less completely oxidized than toluic acid, the extent of xylene removal being at least such that $$M=5.27(e^{-5.355X})$$

wherein "M" is the number of moles of xylene remaining in the concentrated oxidate per mole, on a xylene-free basis, of concentrated oxidate and "X" is the fraction of the xylene converted in the first oxidation zone;
    (c) Further oxidizing, in the liquid phase, the concentrated oxidate, by continuously introducing the concentrated oxidate and molecular oxygen into a second oxidation zone containing a $C_2$–$C_6$ aliphatic carboxylic acid solvent and an oxidation catalyst selected from at least one member of the group consisting of cobalt, manganese, vanadium and cerium dissolved with the solvent, said second oxidation zone being maintained at a temperature within the range of from about 50° C. to about 150° C.;
    (d) Withdrawing from said second oxidation zone a slurry of the phthalic acid product in the carboxylic acid solvent; and,
    (e) Recovering the phthalic acid product from the slurry.

2. A process in accordance with claim 1 wherein the xylene is meta-xylene and the phthalic acid is isophthalic acid.

3. A process in accordance with claim 1 wherein the xylene is para-xylene and the phthalic acid is terephthalic acid.

4. A process in accordance with claim 1 wherein the xylene conversion in the first oxidation zone is from about 5% to a level not in excess of about 50% and wherein at least about 80% of the unreacted xylene is removed from the oxidate in step (b) of claim 1.

5. A process in accordance with claim 1 wherein the catalyst is cobalt.

6. A process in accordance with claim 1 wherein the second oxidation zone is maintained at a temperature within the range of from about 70° C. to about 135° C.

7. A process in accordance with claim 6 wherein the second oxidation zone is maintained at a temperature within the range of from about 80° C. to about 120° C.

8. A process in accordance with claim 1 wherein no solvent is employed in step (a) of claim 1.

9. A process in accordance with claim 1 wherein the amount of solvent employed within the second oxidation zone is sufficient to maintain an aromatics concentration not in excess of 5 moles of aromatics per liter of solvent.

10. A process in accordance with claim 9 wherein the solvent is acetic acid.

11. A process for the oxidation of at least one member of the group consisting of meta- and para-xylene to the corresponding phthalic acid which comprises:
    (a) Oxidizing, at a temperature between about 50° C. and about 220° C., the xylene with molecular oxygen in the liquid phase within a first oxidation zone in the presence of from about 1 p.p.m. to about 5000 p.p.m. of an oxidation catalyst selected from at least one member of the group consisting of the polyvalent heavy metals having atomic numbers from 23 to 29 inclusive and cerium and in the absence of an extraneous solvent until from about 10 to not in excess of about 40% of the xylene has been converted to an oxidate comprising unreacted xylene, toluic acid and oxygen-containing $C_8$ aromatic compounds, less completely oxidized than toluic acid, said oxidate containing, on a xylene-free basis, from about 15 mole percent to about 60 mole percent of tolyl alcohol, from about 15 mole percent to about 70 mole percent of tolualdehydes, from about 4 mole percent to about 65 mole percent of toluic acid, from about 0.001 mole percent to about 5 mole percent of carboxylbenzyl alcohols, from about 0.001 mole percent to about 5 mole percent of carboxybenzaldehydes and from about 0.001 mole percent to about 10 mole percent of phthalic acids;
    (b) Removing at least 90% of the unconverted xylene from the oxidate to recover a concentrated oxidate containing less than 5 wt. percent of unconverted xylene and comprising the toluic acid and the oxygen-containing $C_8$ aromatic compounds, less completely oxidized than toluic acid, the extent of xylene removal being at least such that $$M=5.27(e^{-5.355X})$$

wherein "M" is the number of moles of xylene remaining in the concentrated oxidate per mole, on a xylene-free basis, of concentrated oxidate and "X" is the fraction of the xylene converted in the first oxidation zone;
    (c) Further oxidizing in the liquid phase the concentrated oxidate by continuously introducing the concentrated oxidate and molecular oxygen into a second oxidation zone containing a $C_2$–$C_6$ aliphatic carboxylic acid solvent and an oxidation catalyst dissolved within the solvent, the catalyst being selected from at least one member of the group consisting of the polyvalent heavy metals having atomic numbers from 23 to 29 inclusive and cerium, the amount of solvent being such that the concentration of total aromatics therewithin does not exceed 5 moles per liter of solvent during said further oxidation and the amount of catalyst being between about 0.01 mole per liter of liquid phase and about 0.6 mole per liter of liquid phase, said second oxidation zone being maintained at a temperature within the range of from about 50° C. to about 150° C.;

(d) Withdrawing from said second oxidation zone a slurry of the phthalic acid product in the carboxylic acid solvent; and, (e) Recovering the phthalic acid product from the slurry.

12. A process in accordance with claim 11 wherein the catalyst is cobalt.

13. A process in accordance with claim 11 wherein the solvent is acetic acid.

References Cited
UNITED STATES PATENTS

| | | | |
|---|---|---|---|
| 2,851,487 | 9/1958 | Dietz | 260—524 R |
| 3,064,044 | 11/1962 | Baldwin | 260—524 R |
| 3,155,718 | 11/1964 | Brown et al. | 260—524 R |

FOREIGN PATENTS

| | | | |
|---|---|---|---|
| 666,709 | 2/1952 | United Kingdom | 260—524 R |

LORRAINE A. WEINBERGER, Primary Examiner

R. D. KELLY, Assistant Examiner

UNITED STATES PATENT OFFICE
CERTIFICATE OF CORRECTION

Patent No. 3,845,117　　　　　　　　　Dated October 29, 1974

Inventor(s) John Kollar

It is certified that error appears in the above-identified patent and that said Letters Patent are hereby corrected as shown below:

Column 2, line 5, "products" should read -- produces --. Column 3, line 35, "phraseology oxygen-containing" should read -- phraseology "oxygen-containing" --. Column 4, line 61, "toluene moieties" should read -- toluate moieties --; line 66, delete "con-"; line 67, "molecuular" should read -- molecular --. Column 5, the equation at line 50 should appear as shown below:

$$M = 5.27 \left( e^{-5.355X} \right).$$

Column 6, line 24, "acid the" should read -- acid is the --; line 38, "from 15%" should read -- from about 15% --. Column 11, Table I, 4th column heading, "Cobgalt" should read -- Cobalt --.

Signed and sealed this 11th day of February 1975.

(SEAL)
Attest:

RUTH C. MASON
Attesting Officer

C. MARSHALL DANN
Commissioner of Patents
and Trademarks